(12) United States Patent
Khlifi

(10) Patent No.: US 11,561,301 B2
(45) Date of Patent: Jan. 24, 2023

(54) RADAR ARRANGEMENT FOR A MOTOR VEHICLE, AND MOTOR VEHICLE

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 502 days.

(21) Appl. No.: 16/470,507

(22) PCT Filed: Dec. 21, 2017

(86) PCT No.: PCT/EP2017/084099
§ 371 (c)(1),
(2) Date: Jun. 17, 2019

(87) PCT Pub. No.: WO2018/130402
PCT Pub. Date: Jul. 19, 2018

(65) Prior Publication Data
US 2019/0324137 A1    Oct. 24, 2019

(30) Foreign Application Priority Data

Jan. 10, 2017  (DE) .................... 102017200273.5

(51) Int. Cl.
*G01S 13/93* (2020.01)
*G01S 13/931* (2020.01)
(Continued)

(52) U.S. Cl.
CPC .......... *G01S 13/931* (2013.01); *H01Q 1/273* (2013.01); *H01Q 1/42* (2013.01); *B60R 13/005* (2013.01);
(Continued)

(58) Field of Classification Search
CPC ............ G01S 13/931; G01S 13/93271; G01S 13/93272; H01Q 1/42; H01Q 1/273; B60R 13/005; B60Y 2400/3017
See application file for complete search history.

(56) References Cited

U.S. PATENT DOCUMENTS 6,184,842 B1   2/2001  Leinweber et al.
7,847,731 B2  12/2010  Wiesbeck et al.
(Continued)

FOREIGN PATENT DOCUMENTS

DE    102007039897 B3   10/2008
DE    102013212090 A1    1/2015
(Continued)

OTHER PUBLICATIONS

International Preliminary Report on Patentability directed to related International Patent Application No. PCT/EP2017/084099, dated Mar. 29, 2019, with attached English language translation; 10 pages.
(Continued)

*Primary Examiner* — Timothy A Brainard
(74) *Attorney, Agent, or Firm* — Sterne, Kessler, Goldstein & Fox P.L.L.C.

(57) ABSTRACT

The disclosure relates to a radar arrangement for a motor vehicle, comprising at least one radar sensor with at least one antenna arrangement, wherein at least two antenna arrangements are arranged at a distance defined in an arrangement direction on a carrier component, which is permeable in particular to radar radiation, of the motor vehicle, and wherein the radar arrangement has a control device for common transmission and reception operation of the at least two antenna arrangements, such that these have the effect of a single virtual antenna arrangement with increased antenna extension in the arrangement direction.

8 Claims, 2 Drawing Sheets

(51) Int. Cl.
*H01Q 1/27* (2006.01)
*H01Q 1/42* (2006.01)
*B60R 13/00* (2006.01)

(52) U.S. Cl.
CPC ............... *B60Y 2400/3017* (2013.01); *G01S 2013/93271* (2020.01); *G01S 2013/93272* (2020.01)

(56) References Cited

U.S. PATENT DOCUMENTS

| | | | |
|---|---|---|---|
| 9,869,762 B1* | 1/2018 | Alland | H01Q 21/08 |
| 10,914,818 B2 | 2/2021 | Schoor | |
| 2010/0134344 A1* | 1/2010 | Uesato | G01S 7/4026 |
| | | | 342/156 |
| 2014/0091969 A1* | 4/2014 | Shi | G01S 13/02 |
| | | | 342/385 |
| 2016/0282450 A1 | 9/2016 | Kishigami et al. | |
| 2017/0352938 A1* | 5/2017 | Okumura | H01Q 1/02 |
| | | | 343/704 |
| 2017/0276788 A1* | 9/2017 | Wodrich | G01S 13/878 |
| 2017/0329002 A1 | 11/2017 | Koerber et al. | |

FOREIGN PATENT DOCUMENTS

| | | |
|---|---|---|
| DE | 102013223783 A1 | 5/2015 |
| DE | 102014105271 A1 | 10/2015 |
| DE | 102014109105 A1 | 12/2015 |
| DE | 102014009861 A1 | 1/2016 |
| DE | 102014010828 A1 | 1/2016 |
| DE | 102014118031 A1 | 6/2016 |
| DE | 102016210771 B3 | 10/2017 |
| EP | 0954052 A2 | 11/1999 |
| EP | 2293382 A1 | 3/2011 |
| EP | 2966725 A1 | 1/2016 |
| EP | 3001221 A1 | 3/2016 |

OTHER PUBLICATIONS

International Search Report and Written Opinion of the International Searching Authority directed to related International Patent Application No. PCT/EP2017/084099, dated Mar. 28, 2018, with attached English-language translation; 21 pages.

Lee, Jri et al., "A Fully-Integrated 77-GHz FMCW Radar Transceiver in 65-nm CMOS Technology," IEEE Journal of Solid-State Circuits, vol. 45, No. 12, Dec. 2010; pp. 2746-2756.

* cited by examiner

RADAR ARRANGEMENT FOR A MOTOR VEHICLE, AND MOTOR VEHICLE

TECHNICAL FIELD

The present application relates to a radar arrangement for a motor vehicle, comprising at least one radar sensor with at least one antenna arrangement. The application additionally relates to a motor vehicle.

BACKGROUND

The use of radar sensors in motor vehicles is already widely known in the prior art. Radar sensors are nowadays usually used as environmental sensors for a medium and larger distance range in order to be able to determine the distance, angle and relative speed of other road users or larger objects. Such radar data can be used by environmental models or also be made directly available to vehicle systems. In the known state of the art, it is, for example, longitudinal guidance systems, such as ACC, or also security systems that make use of radar data. The use of radar sensors in the interior of the motor vehicle has also previously been proposed.

Radar sensors of conventional design usually have larger dimensions and are rather bulky after the antennas and the electronic components needed directly on the antenna, i.e. the radar front end, are integrated in a housing. The electronic components mainly constitute the radar transceiver, which contains a frequency control (usually comprising a phase-locked loop-PLL), mixing devices, a low noise amplifier (LNA) and the like, but control modules and digital signal processing components are often also implemented close to the antenna, for example in order to be able to supply already processed sensor data, such as object lists, on a connected bus, such as a CAN bus.

The implementation of semiconductor-based radar components has long proved difficult, as expensive specialty semiconductors, particularly GaAs, have been required. Smaller radar sensors have been proposed, of which the entire radar front end was implemented on a single chip using SiGe technology before solutions using CMOS technology also became known. Such solutions are the result of extending CMOS technology to high frequency applications, often referred to as RF CMOS. Such a CMOS radar chip is designed to be extremely compact and does not use expensive special semiconductors and above all offers significant advantages over other semiconductor technologies, especially in production. An exemplary implementation of a 77 GHz radar transceiver as a CMOS chip is described in the article by Jri Lee et al., "A Fully Integrated 77 GHz FMCW Radar Transceiver in 65 nm CMOS Technology", IEEE Journal of Solid State Circuits 45 (2010), pp. 2746-2755.

Following the additional proposal to implement the chip and the antenna in a shared package, a very low-cost small radar sensor is obtainable, which can meet the space requirements significantly better and also has a very low signal-to-noise ratio because of the short signal paths and is suitable for high frequencies and greater, variable frequency bandwidths. Such small-sized radar sensors can therefore also be used for short-range applications, for example in the range of 30 cm to 10 m.

It has also been proposed to provide such a CMOS transceiver chip and/or a package having a CMOS transceiver chip and an antenna with a digital signal processing processor (DSP processor) on a joint printed circuit board, or to also integrate the functions of the signal processor in the CMOS transceiver chip. A similar integration is possible for control functions.

Nowadays, many radar sensors of a motor vehicle, such as radar sensors for an ACC system, are still visibly installed on the motor vehicle. Ways are being sought, for design reasons, to also install radar sensors so they are concealed. DE 10 2013 223 783 A1 states regarding this that it is known to use a plate or flat bowl on which an emblem or a logo is integrated as a radome. The radome is to be cleaned by using ultrasound. The advantage of placing a radar sensor behind a logo or emblem is that these are usually disposed in the center of the front or rear region of the motor vehicle. Such center positions are particularly suitable locations for the radar sensor because of the symmetry.

The angular resolution of radar sensors plays an important role in the ability to distinguish between different objects in a traffic situation. The angular resolution of a radar sensor depends substantially on the size of the antenna arrangement. The greater the effective length of the antenna arrangement, which is also referred to as the aperture, the higher is the angular resolution in this direction. Since radar sensors are limited in size, the size of the antenna arrangement can only be increased up to a certain surface area, for example 10 cm×10 cm. This size limitation also leads to a size limitation in the achievable angular resolution.

DETAILED DESCRIPTION

Figure 1:
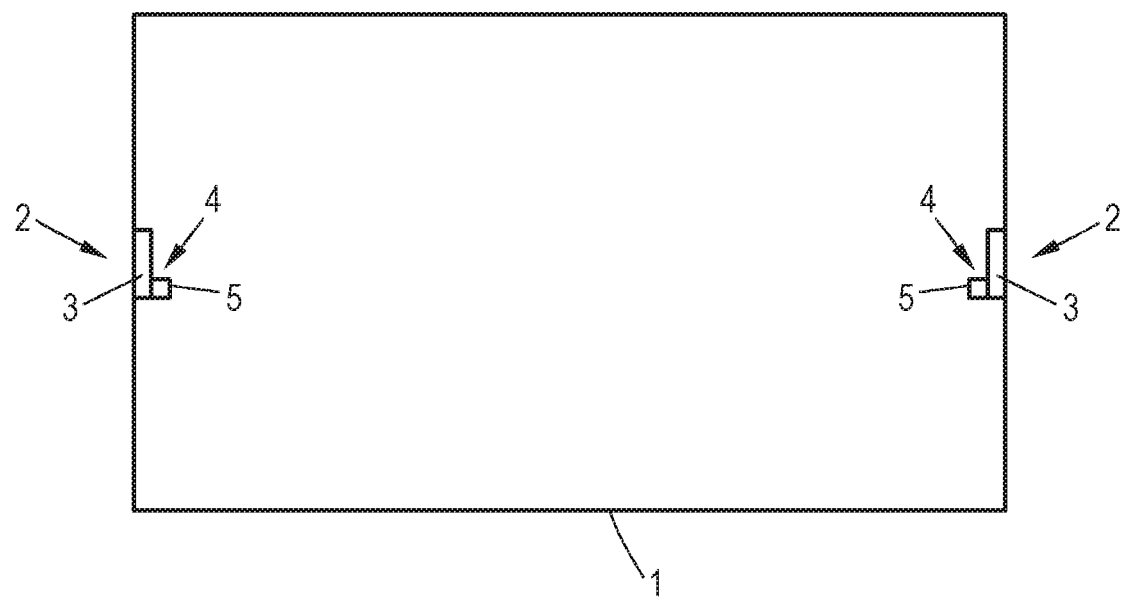
FIG. 1 shows a motor vehicle according to the application.

The present application relates to a radar arrangement for a motor vehicle, comprising at least one radar sensor with at least one antenna arrangement. The application additionally relates to a motor vehicle.

The use of radar sensors in motor vehicles is already widely known in the prior art. Radar sensors are nowadays usually used as environmental sensors for a medium and larger distance range in order to be able to determine the distance, angle and relative speed of other road users or larger objects. Such radar data can be used by environmental models or also be made directly available to vehicle systems. In the known state of the art, it is, for example, longitudinal guidance systems, such as ACC, or also security systems that make use of radar data. The use of radar sensors in the interior of the motor vehicle has also previously been proposed.

Radar sensors of conventional design usually have larger dimensions and are rather bulky after the antennas and the electronic components needed directly on the antenna, i.e. the radar front end, are integrated in a housing. The electronic components mainly constitute the radar transceiver, which contains a frequency control (usually comprising a phase-locked loop-PLL), mixing devices, a low noise amplifier (LNA) and the like, but control modules and digital signal processing components are often also implemented close to the antenna, for example in order to be able to supply already processed sensor data, such as object lists, on a connected bus, such as a CAN bus.

The implementation of semiconductor-based radar components has long proved difficult, as expensive specialty semiconductors, particularly GaAs, have been required. Smaller radar sensors have been proposed, of which the entire radar front end was implemented on a single chip using SiGe technology before solutions using CMOS technology also became known. Such solutions are the result of extending CMOS technology to high frequency applications, often referred to as RF CMOS. Such a CMOS radar chip is designed to be extremely compact and does not use expensive special semiconductors and above all offers significant advantages over other semiconductor technologies, especially in production. An exemplary implementation of a 77 GHz radar transceiver as a CMOS chip is described in the article by Jri Lee et al., "A Fully Integrated 77 GHz FMCW Radar Transceiver in 65 nm CMOS Technology", IEEE Journal of Solid State Circuits 45 (2010), pp. 2746-2755.

Following the additional proposal to implement the chip and the antenna in a shared package, a very low-cost small radar sensor is obtainable, which can meet the space requirements significantly better and also has a very low signal-to-noise ratio because of the short signal paths and is suitable for high frequencies and greater, variable frequency bandwidths. Such small-sized radar sensors can therefore also be used for short-range applications, for example in the range of 30 cm to 10 m.

It has also been proposed to provide such a CMOS transceiver chip and/or a package having a CMOS transceiver chip and an antenna with a digital signal processing processor (DSP processor) on a joint printed circuit board, or to also integrate the functions of the signal processor in the CMOS transceiver chip. A similar integration is possible for control functions.

Nowadays, many radar sensors of a motor vehicle, such as radar sensors for an ACC system, are still visibly installed on the motor vehicle. Ways are being sought, for design reasons, to also install radar sensors so they are concealed. DE 10 2013 223 783 A1 states regarding this that it is known to use a plate or flat bowl on which an emblem or a logo is integrated as a radome. The radome is to be cleaned by using ultrasound. The advantage of placing a radar sensor behind a logo or emblem is that these are usually disposed in the center of the front or rear region of the motor vehicle. Such center positions are particularly suitable locations for the radar sensor because of the symmetry.

The angular resolution of radar sensors plays an important role in the ability to distinguish between different objects in a traffic situation. The angular resolution of a radar sensor depends substantially on the size of the antenna arrangement. The greater the effective length of the antenna arrangement, which is also referred to as the aperture, the higher is the angular resolution in this direction. Since radar sensors are limited in size, the size of the antenna arrangement can only be increased up to a certain surface area, for example 10 cm×10 cm. This size limitation also leads to a size limitation in the achievable angular resolution.

It is therefore the object of the application to indicate a possible way to improve the angular resolution of radar sensors in a motor vehicle.

To achieve this object, provisions are made according to the application, in the radar arrangement of the type mentioned at the outset, for at least two antenna arrangements to be disposed at a defined distance in an arrangement direction on a carrier component, which is permeable in particular to radar radiation, of the motor vehicle, and for the radar arrangement to have a control device for common transmission and reception operation of the at least two antenna arrangements such that they have the effect of a single virtual antenna arrangement with increased antenna extension in the arrangement direction.

According to the application, it is therefore proposed to use a plurality, in particular two, antenna arrangements, which are disposed at a constant distance. To accomplish this, the antenna arrangements are disposed on a carrier component at the desired defined distance. The advantage of using such a carrier component is that the distance between the individual antenna arrangements is fixed. This distance is relevant for an angle measurement. It is particularly expedient if the defined distance is an integer multiple of a wavelength of the radar radiation used. Provisions can, for example, be made to use a value of about 19.5 cm as a defined distance when radar radiation having a frequency of 77 GHz (hence a wavelength of 3.9 mm) is used.

Because of the different localization of the individual antenna arrangements and coherent control of both antenna arrangements, it is possible to create a virtual antenna arrangement with an enlarged antenna size, which can in turn lead to an increased angular resolution. In other words, according to the application, a control device is made available, which is configured for joint control of antenna elements of the antenna arrangements during transmission and/or reception, as antenna elements of the virtual antenna arrangement. A simultaneous or at least a temporally coordinated transmission mode of the transmission antenna elements of the antenna arrangement is in particular achievable; the same applies ultimately for radar signals received by reception antenna elements of the antenna arrangement, which are subject to a common evaluation. The at least two spatially separated antenna arrangements then substantially correspond to one virtual antenna arrangement having an enlarged virtual aperture in at least the direction in which the antenna arrangements follow each other.

The example of two antenna arrangements will frequently be used hereinafter, so that it is then possible to refer to a stereo-radar system. However, the application can also be applied to more than two antenna arrangements, in particular if the carrier component provides a surface area which can be used expediently by more than two antenna arrangements.

In this context, the new developments in semiconductor technology for radar sensors discussed at the outset can also be used to particular advantage, in particular with regard to components with a compact design and a high quality of the radar data. An expedient development of the present application thus specifies that the antenna arrangements are to be implemented as part of a semiconductor package which, in addition to the respective antenna arrangement, comprises a semiconductor chip, in particular a CMOS chip, which provides for a radar transceiver. Such packages can also be referred to as "radar chips". The semiconductor chip can additionally provide for the digital signal processing component (DSP) and/or a control unit. Such packages can advantageously be implemented to be compact and cost-effective, with each package of this type also functioning as a separate radar sensor. Control units for such packages, which are implemented by the semi-conductor chip, can serve as part of the control device.

Regardless of the just described use of semiconductor technology, but particularly advantageously using the semiconductor technology, it is also conceivable for each antenna arrangement to be associated with its own radar sensor, the radar sensors being fastened to the carrier component at the defined distance. In this way, finished, complete radar sensors, particularly using semiconductor technology, can ultimately be used without special, additional structures being necessary. Semiconductor radar sensors in particular bring with them a certain intrinsic intelligence, in particular in the form of the aforesaid control unit, so that a higher level control component of the control device, using this intrinsic intelligence, can be provided to implement the shared control of the spaced, respective antenna arrangements of the radar sensors.

In a development of the application, provisions can be made for the antenna arrangements to be disposed on a common substrate. In doing so, provisions can specifically be made for the substrate to be applied to one side of the carrier component or for a printed circuit board fastened to one side or within the carrier component to be used as the substrate. It is by way of such a common substrate, in particular a common circuit board, that control lines for the common control of the antenna arrangements can be implemented with particular advantage. For the actual implementation of the substrate, the carrier component can be coated with a suitable antenna substrate on the antenna side, upon which the antenna arrangements can be placed. It is however also conceivable to integrate this printed circuit board in the carrier component if a printed circuit board is used; for example, to cast the printed circuit board with the antenna arrangements disposed thereon (and preferably also semiconductor chips implementing radar transceivers) or the like.

The carrier component to be irradiated by the radar beam can expediently be designed as a radome for the antenna arrangements. The carrier component may, for instance, be made of plastics material or another suitable material, which is at least partially shaped so that a radome can be implemented. It is self-evident that, to implement a radome, provisions need to made to produce the carrier component from a plurality of different materials, in particular if the carrier component is to be visible from the outside as will be explained below, in order to provide a uniform surface for an inner structure acting as a radome.

In a particularly expedient development of the present application, provisions are made for the carrier component to be a decorative component having a visible side that can be seen from the outside and for the antenna arrangements to be disposed on a rear side opposite the visible side and/or inside the carrier component. The visible side can most advantageously display a logo and/or an emblem of the manufacturer of the motor vehicle. Such logo and emblem components are often located in the center of the front or the rear of the vehicle and are therefore in a position that represents a particularly preferred location for installing a radar sensor because of its symmetry. The carrier component designed in this case to be permeable to radar radiation provides for the desired predefined, constant distance between the antenna arrangements in a structural way and, as a general decorative component, also offers an elegant way of installing a radar sensor so that it is out of sight. For example, a logo and/or an emblem, which has hitherto been made of metal, can now be incorporated in the material, in particular so that a 3D effect is achieved. A particularly high degree of integration with readily predefinable spacings and more sensible positioning of the radar arrangement representing a concealed installation is obtained when the carrier component in the form of a decorative component also acts as a radome for the antenna arrangements.

In addition to the radar arrangement, the application also relates to a motor vehicle comprising at least one radar arrangement according to the application. All statements applying to the radar arrangement can be analogously transferred to the motor vehicle according to the application with which the aforesaid advantages can also be obtained. The carrier component is particularly advantageously configured as a decorative component, in particular as a decorative component carrying an emblem and/or a logo, and is disposed in the center of the front and/or rear side of the motor vehicle. The radar arrangement can then, for example, consist of a radar sensor for a long-range radar, for example an ACC radar sensor.

It should be noted that it is quite conceivable in the context of the present application—for at least a part of the control device not to be disposed in or on the carrier component, but rather in a separate unit, for example in a housing, adjacent to and/or otherwise close to the carrier component.

Further advantages and details of the present application will become apparent from the embodiments described below and with reference to the drawings, which show:

FIG. 1 shows a motor vehicle according to the application.

Figure 2:
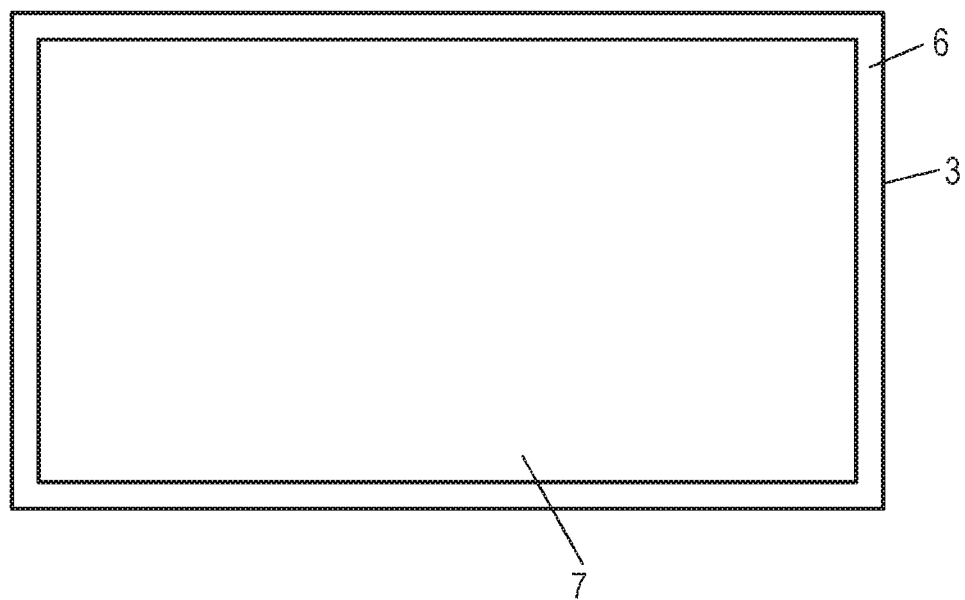
FIG. 2 shows a front side of a first embodiment of a carrier component.

FIG. 2 shows a front side of a first embodiment of a carrier component.

Figure 3:
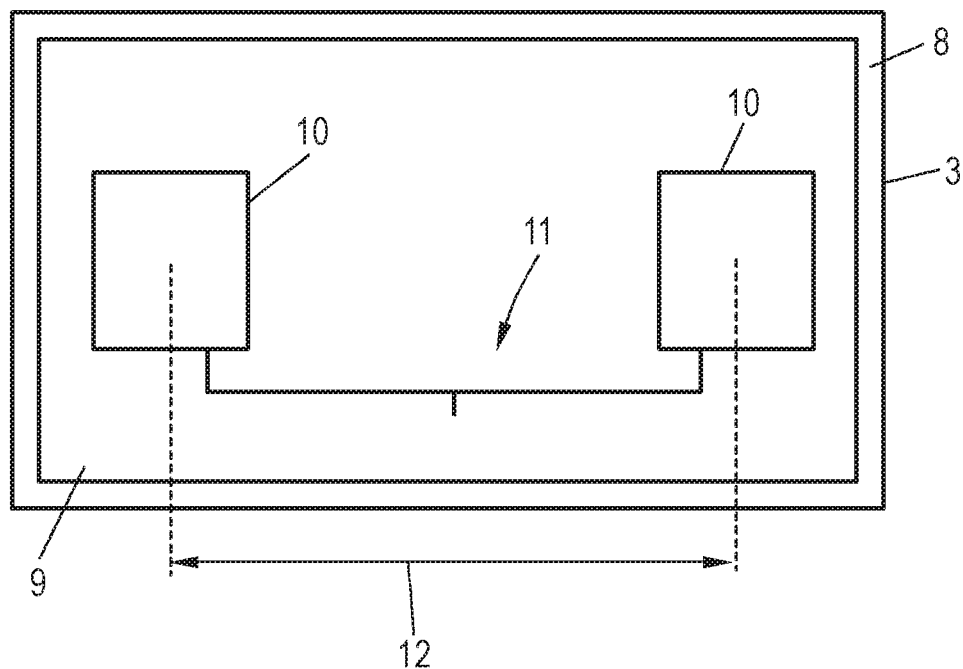
FIG. 3 shows a rear side of a first embodiment of a carrier component.

FIG. 3 shows a rear side of a first embodiment of a carrier component.

Figure 4:
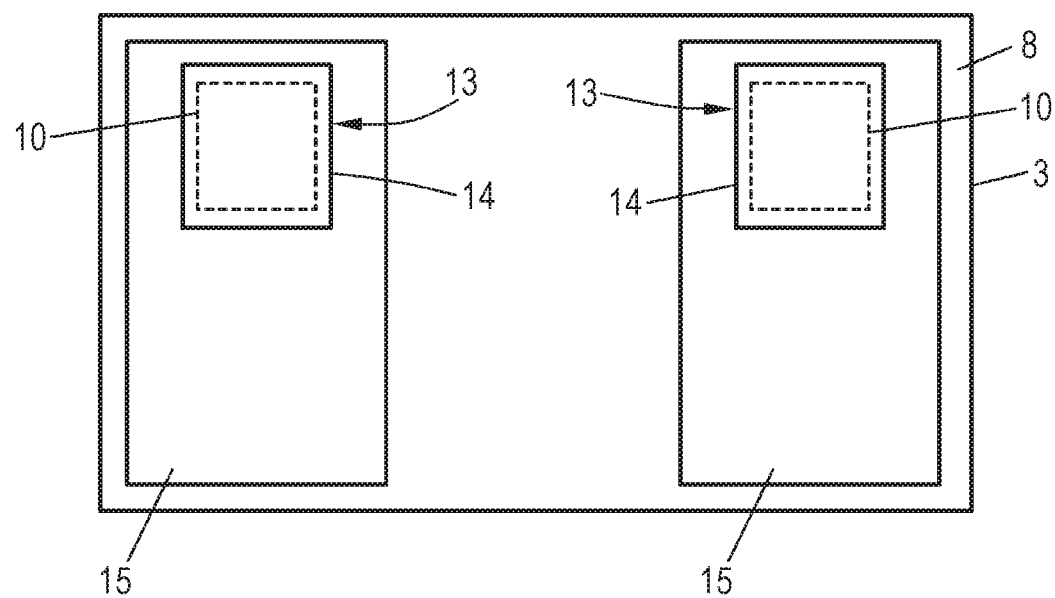
FIG. 4 shows a rear side of a second embodiment of a carrier component.

FIG. 4 shows a rear side of a second embodiment of a carrier component.

FIG. 1 is a schematic diagram of a motor vehicle 1 according to the application. To display an emblem and/or a logo of the manufacturer of the motor vehicle 1, both the front side of the motor vehicle 1 and the rear side of the motor vehicle 1 have a decorative component 2 in the center, which displays the relevant emblem and/or logo on a visible side that can be seen from outside or from the front side, but simultaneously also functions as a carrier component 3 of a respective radar arrangement 4, which, as will be shown in greater detail below, carries at least two antenna arrangements, which are spaced apart in a defined manner, which are jointly controllable via a control device 5 that is only hinted at here, and which can be partially disposed in a box outside the carrier component 3, so that a virtual antenna arrangement with an enlarged virtual aperture is created and an improved angular resolution is thus achievable. The radar arrangements 4 and the corresponding decorative components 2 are disposed in the center of the front and the rear, in particular at equal distances from both sides of the motor vehicle 1, so that optimum symmetry for a measurement is achieved.

FIG. 2 shows the front side or visible side 6 of a carrier component 3 according to a first embodiment. As can be seen, the visible side 6 comprises an emblem 7 (not shown in greater detail here) which is, in the present case, implemented by a surface structure on the visible side 6 such that a 3D effect results. The carrier component 3 as a whole is designed to be permeable to radar radiation and, by using two different materials, in particular plastics materials, has an internal molded shape, which makes it possible to use the carrier component 3 as a radome.

FIG. 3 shows the rear side 8 of the carrier component 3 according to the first embodiment. It is apparent that the rear side 8 is at least partially coated with a substrate 9 to which, in the present case, two antenna arrangements 10 as well as electrical wiring 11, also only hinted at here, suitable for controlling the antenna arrangements 10 are applied. Components of the control device 5 can also be disposed on the substrate 9. The spacing 12 between the antenna arrangements 10 is selected to be a multiple of the wavelength of the radar radiation used, in the present case about 19.5 cm at a frequency of 77 GHz.

Due to the shared, coherent control of the antenna arrangements 10 by means of the control device 5, it is now possible to significantly improve the angular resolution, since a virtually extended aperture is provided.

FIG. 4 shows the rear side 8 of a further embodiment of a carrier component 3. The antenna arrangements 10 are implemented here as part of a package 13 using semiconductor technology, which additionally comprises a semiconductor chip 14, by means of which at least one radar transceiver is implemented, in particular also a digital signal processing component and/or a control unit, which can then constitute a part of the control device 5. A separate radar sensor is, in principle, implemented by each of the packages, which are shown on separate circuit boards 15 in the present case, but which can also be implemented on a shared circuit board, the radar sensor in the first embodiment according to FIG. 3 comprising the radar transceiver provided on the control device side and both antenna arrangements 10.

It should also be pointed out that it may also be expedient, particularly in the case of an arrangement on a shared printed circuit board, to integrate the printed circuit board along with the installed packages 13 into the carrier component 3, for example by casting or the like.

The invention claimed is:

1. A radar arrangement for a motor vehicle comprising:
   a carrier component of the motor vehicle which is permeable to a radar radiation;
   two antenna arrangements disposed from one another at a defined distance in an arrangement direction on the carrier component;
   a control device for common transmission and reception operation of the two antenna arrangements by means of coherent control, such that the two antenna arrangements have an effect of a single virtual antenna arrangement with an increased antenna extension in the arrangement direction;
   a radar sensor which is allocated to each antenna arrangement fastened to the carrier component at the defined distance; and
   a semiconductor package, in which the antenna arrangements are implemented, comprising a semiconductor chip, wherein the semiconductor chip constitutes a radar transceiver in addition to the antenna arrangements.

2. The radar arrangement according to claim 1, wherein the defined distance is an integer multiple of a wavelength used by the radar radiation.

3. The radar arrangement according to claim 1, wherein the antenna arrangements are disposed on a common substrate.

4. The radar arrangement according to claim 1, wherein a common substrate is applied to one side of the carrier component or to a circuit board fastened to one side of or inside the carrier component.

5. The radar arrangement according to claim 1, wherein the carrier component is configured as a radome for the antenna arrangements.

6. The radar arrangement according to claim 1, wherein the carrier component is an ornamental component having a visible side that is visible from the outside and a rear side opposite the visible side, wherein the antenna arrangements are disposed on the rear side or inside the carrier component.

7. The radar arrangement according to claim 6, wherein the visible side displays a logo or an emblem of a manufacturer of the motor vehicle.

8. A motor vehicle comprising a radar arrangement, wherein the radar arrangement comprises:
   a carrier component of the motor vehicle which is permeable to a radar radiation;
   two antenna arrangements disposed from one another at a defined distance in an arrangement direction on the carrier component;
   a control device for common transmission and reception operation of the two antenna arrangements by means of coherent control, such that the two antenna arrangements have an effect of a single virtual antenna arrangement with an increased antenna extension in the arrangement direction;
   a radar sensor which is allocated to each antenna arrangement fastened to the carrier component at the defined distance; and
   a semiconductor package, in which the antenna arrangements are implemented, comprising a semiconductor chip, wherein the semiconductor chip constitutes a radar transceiver in addition to the antenna arrangements.

* * * * *